United States Patent [19]

Furuta

[11] 4,056,828
[45] Nov. 1, 1977

[54] RUN LENGTH ENCODING AND DECODING METHODS AND MEANS

[75] Inventor: Eiichiro Furuta, Ebina, Japan

[73] Assignee: Xerox Corporation, Stamford, Conn.

[21] Appl. No.: 726,865

[22] Filed: Sept. 27, 1976

[30] Foreign Application Priority Data

Sept. 29, 1975 Japan ............................ 50-117394

[51] Int. Cl.² ........................................... H04N 7/12
[52] U.S. Cl. .................................. 358/133; 358/261; 358/262; 358/260; 325/38 A; 178/68
[58] Field of Search ............ 325/38 A; 358/260, 261, 358/262, 133; 178/68; 340/347 DD

[56] References Cited

U.S. PATENT DOCUMENTS

| | | | |
|---|---|---|---|
| 3,233,236 | 2/1966 | Katzenstein | 325/38 A |
| 3,337,864 | 8/1967 | Lender | 325/38 A |
| 3,502,806 | 3/1970 | Townsend | 358/261 |
| 3,847,732 | 11/1974 | Perreault | 178/68 |

Primary Examiner—Robert L. Griffin
Assistant Examiner—Edward L. Coles

[57] ABSTRACT

Black and white run length encoding means first convert a binary video input signal having a raster scan format into binary black and white run length message codes which are preselected so that the initial or lead bit of each of those codes is at a given logic level. Ternary encoding means then convert the binary message codes into a series of ternary black and white run length message codes which have distinctive amplitude transitions at any intra-scan line code boundaries. To recover the video signal, the process is reversed. Moreover, a passband signal for transmitting the ternary codes from a transmitting terminal to a receiving terminal via a limited bandwidth communications channel may be provided by amplitude modulating a carrier frequency signal in accordance with the ternary codes.

7 Claims, 5 Drawing Figures

RUN LENGTH ENCODING AND DECODING METHODS AND MEANS

BACKGROUND OF THE INVENTION

This invention relates to run length encoding and decoding for raster scanned imaging systems and, more particularly, to methods and means for highlighting the boundaries between serial run length message codes of variable length.

Raster scanned imaging systems often are data rate limited. For example, conventional facsimile systems typically depend on limited bandwidth communications channels, such as are provided by the public switched telephone network. Accordingly, to increase the throughput of those systems, substantial effort and expense have been devoted to the development of data compression and decompression techniques for eliminating and then restoring the redundant information that is commonly found in video signals having a raster scan format — viz., signals comprising a predetermined number of serial picture elements for each of a plurality of successive, substantially equidistantly spaced scan lines. Of course, in facsimile systems, throughput is customarily expressed in terms of a document transmission time.

Others have recognized that run length encoding and decoding may be employed in digital raster scanned imaging systems for compressing and decompressing, respectively, binary video signals. In that context, a "run" is classically defined as being an uninterrupted series of picture elements of the same logic level. Thus, run length encoding is utilized to convert the white and/or black runs of a binary video signal having a raster scan format into corresponding run length message codes. Conversely, run length decoding is a complementary process for reconverting those message codes into white and/or black runs of the appropriate length to reconstruct the video signal.

As a general rule, the run length message codes are of variable length (i.e., bit count) to optimize, or at least increase, the data compression. Moreover, the run length message codes are usually serially fed from the encoder to the decoder. Consequently, others have addressed the problem of discriminating between run length message codes of variable length in a serial data stream.

More particularly, it has been suggested that flag codes be inserted into the data stream to separate the run length message codes. That is, however, counterproductive because the additional bits comprised by the flag codes detract from the increased throughput capability offered by the data compression. Another, more sophisticated proposal is to employ mutually exclusive run length message codes so that each code is distinguishable from the prefixes of all other codes. That approach is taken in constructing what are commonly referred to as "Huffman codes," thereby acknowledging D. A. Huffman, "A Method for the Construction of Minimum - Redundancy Codes," *Proceedings of the I.R.E.*, Sept. 1952, pp. 1098-1101. A mutually exclusive or Huffman-type code set has substantial merit, but the complexity of the code set rapidly increases as additional codes are added.

SUMMARY OF THE INVENTION

Against that background, an object of this invention is to provide relatively simple and reliable methods and means for discriminating between serial run length message codes of variable length. A more detailed, related object is to provide methods and means for imparting self-identifying boundaries to serial run length message codes of the foregoing type, without resorting to a mutually exclusive code set.

To carry out those and other objects of the present invention, there are black and white run length encoding means for converting a binary video input signal having a raster scan format into binary black and white run length message codes which are preselected so that the initial or lead bit of each of those codes is at a given logic level. Ternary encoding means then convert the binary message codes into a series of ternary black and white run length message codes which have distinctive amplitude transitions at any intra-scan line code boundaries. To recover the video signal, the process is reversed. Moreover, a passband signal for transmitting the ternary codes from a transmitting terminal to a receiving terminal via a limited bandwidth communications channel may be provided by amplitude modulating a carrier frequency signal in accordance with the ternary codes.

BRIEF DESCRIPTION OF THE DRAWINGS

Still further objects and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with specific reference to a single exemplary embodiment, it is to be understood that there is no intent to limit it to that embodiment. On the contrary, the aim is to cover all modifications, alternatives, and equivalents falling within the spirit and scope of the invention as defined by the appended claims.

Figure 1:
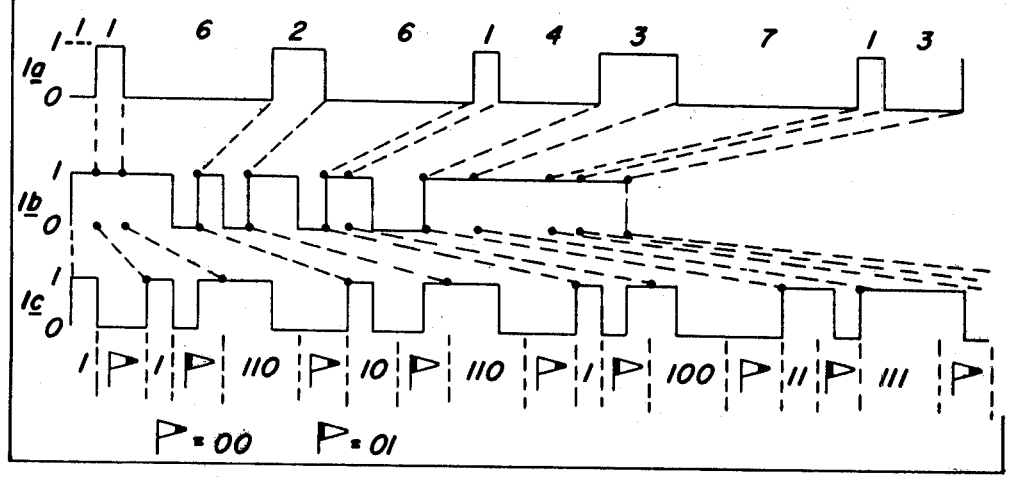
FIG. 1 illustrates a conventional run length encoding process requiring flag codes.

Turning now to the drawings, and at this point especially to FIG. 1, it is known that a binary video signal 1a having a raster scan format can be converted into a series of black and white run length message codes 1b through the use of a run length encoding process. However, if the message codes are of variable length, the boundaries of the successive codes must be clearly identified.

As previous mentioned, others have proposed that flag codes be inserted between the successive run length codes to identify the code boundaries. For example, white-to-black transitions and black-to-white transitions of the video signal 1a may be marked by inserting fixed length flag codes "00" and "01," respectively, between the message codes for the picture elements immediately proceeding and succeeding the transitions. The message codes are selected to exclude the bits patterns for the flag codes so that the alternating series of message codes and flag codes 1c is capable of being decoded to recover the video signal 1a.

Unfortunately, the flag codes incrementally increase the number of bits necessary to convey the video information as indicated by the following analysis of the encoding process shown in FIG. 1:

Table I

| Color Represented | Run Length | Message Code | Flag Code |
|---|---|---|---|
| White | 1 | 1 | 00 |
| Black | 1 | 1 | 01 |
| White | 6 | 110 | 00 |
| Black | 2 | 10 | 01 |
| White | 6 | 110 | 00 |
| Black | 1 | 1 | 01 |
| White | 4 | 100 | 00 |
| Black | 3 | 11 | 01 |
| White | 7 | 111 | 00 |
| Black | 1 | 1 | 01 |
| White | 3 | 11 | 00 |

In this case, if the message code sequence 111101011011001111111 is compared against the message code/flag code sequence 1001011100010011100010110000110111100101110, it will be found that the addition of the flag codes doubles the number of bits in the serial data stream.

Figure 2:
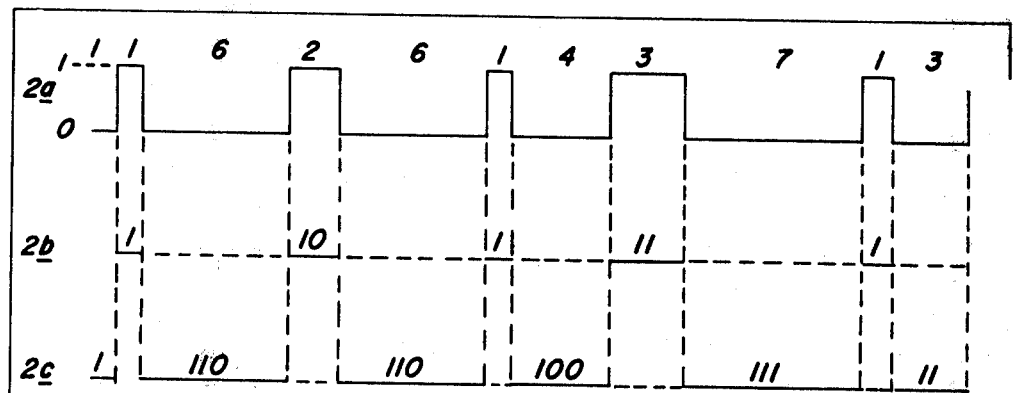
FIG. 2 illustrates a run length encoding process which takes advantage of the present invention.

Referring to FIG. 2, in accordance with this invention, black and white run length message codes are converted into ternary codes so that intra-scan line code boundaries are marked by distinctive amplitude transitions. As in other run length encoding processes, a binary video input signal 2a having a raster scan format is converted into corresponding black and white run length message codes 2b and 2c, respectively. The initial or lead bits of all of the message codes are selected to be at the same, say, high ("1") logic level, but otherwise the codes need only differentiate between runs of different length. Indeed, the message codes need not even distinguish between black and white runs because plural runs within a given scan line inherently alternate between black and white.

In keeping with the present invention, to generate a series of ternary black and white run length message codes 2d having distinctive amplitude transitions at the code boundaries, the bits of the binary message codes 2b and 2c are selectively level shifted. More particularly, as shown, the initial bits and all other bits of like logic level (i.e., the high or "1" logic level bits) within the black message codes 2b are translated to a first, relatively high level. Conversely, the initial bits and all other bits of like logic level (again, the "1" bits) within the white message codes 2c are translated to a second, relatively low level. Furthermore, the other or low ("0") logic level bits of the black and white message codes 2b and 2c are translated to a third, intermediate level. As a result, the ternary codes 2d make transitions from the lowermost or intermediate signal levels to the uppermost signal level to unambiguously identify white-to-black, message code boundaries and from the uppermost or intermediate signal levels to the lowermost signal level to unambiguously identify black-to-white message code boundaries.

Suitably, a passband signal 2e for transmitting the ternary run length message codes from a transmitting terminal to a receiving terminal via a limited bandwidth communications channel is obtained by amplitude modulating a carrier signal of predetermined frequency in accordance with the ternary codes.

Figure 3:
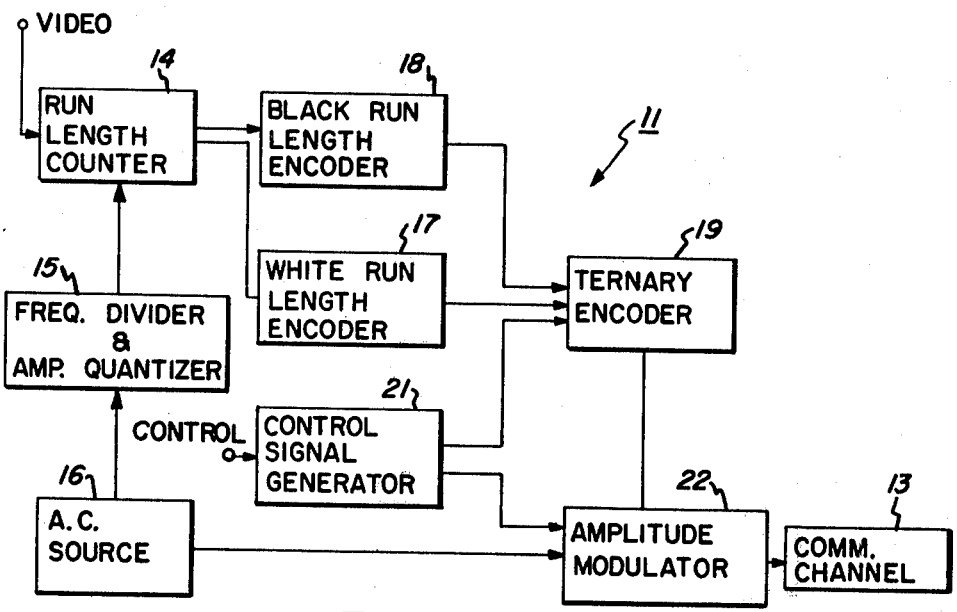
FIG. 3 is a simplified block diagram of a facsimile transmitting terminal including a run length encoder constructed in accordance with this invention.

Turning to FIG. 3, there is a facsimile transmitting terminal 11 (shown only in relevant part) which takes advantage of the above-described process to transmit the information content of a subject copy (not shown) to a remote receiving terminal 12 (FIG. 4) via a limited bandwidth communications channel 13.

In keeping with generally accepted practices, a binary video input signal representing the information content of the subject copy is applied to a run length counter 14 which is incremented at a predetermined rate by clock pulses and selectively reset to convert the runs of black (image representing) and white (background representing) picture elements within the video signal into corresponding counts. Specifically, the counter 14 is synchronously reset (by means not shown) as the scanning of the subject copy advances from scan line-to-scan line and asynchronously reset (by means also not shown) in response to each white-to-black and black-to-white intra-scan line transition of the video input signal. To provide the clock pulses for the counter 14, there suitably is a frequency divider and amplitude quantizer 15 for generating clock pulses in response to a carrier frequency signal supplied by an ac. carrier signal source 16.

More or less conventional white and black run length encoders 17 and 18, respectively, are included to serially generate and temporarily store binary white and black run length message codes, respectively, in response to the counts provided by the run length counter 14. The first count for each scan line is applied to the white run length counter 17 in the expectation that at least the first picture element of each scan line will represent white, background information. Thereafter, any subsequent counts are alternately routed so that the second count is applied to the black run length counter 18, the third to the white run length encoder 17, and so forth until the scanning advances to the next scan line. As will be seen, identical code sets may be used for encoding the black and white runs. It is, however, important that the code sets be selected so that the first bit of each message code is at a given logic level.

A ternary encoder 19 alternately reads the binary message codes provided by the white and black run length encoders 17 and 18 and selectively shifts the bits of those codes as previously described to generate a series of ternary white and black run length message codes having distinctive amplitude transitions at the intra-scan line code boundaries. The usual control signals (such as start of scan signals, end of line signals, synchronization pulses, and error detection signals) are inserted into the data stream before and after each scan line of encoded video by a control signal generator 21. A carrier signal supplied by the signal source 16 is then amplitude modulated in an amplitude modulator 22 to provide a passband signal for transmitting the ternary run length message codes and the control signals to the receiving terminal 12 via the communications channel 13.

Figure 4:
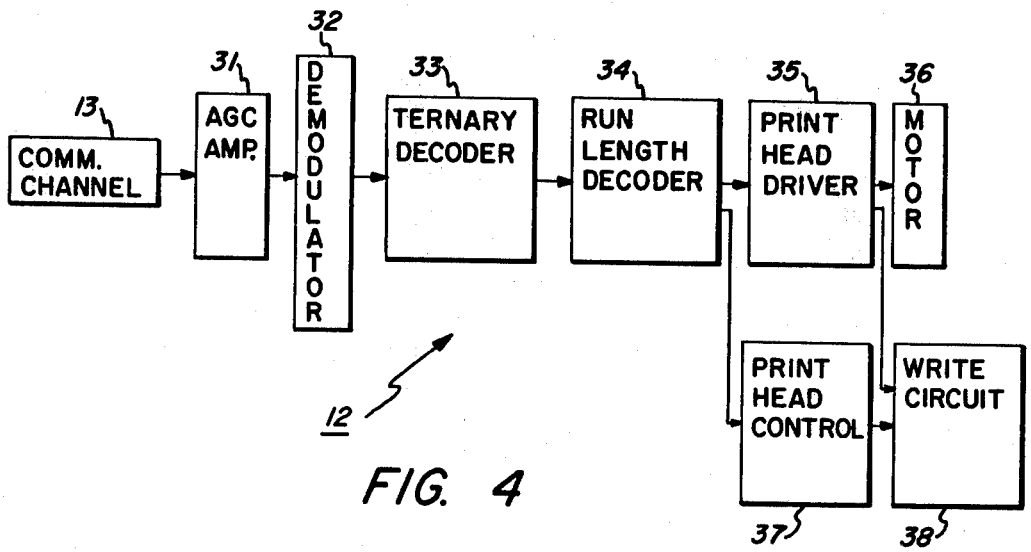
FIG. 4 is a simplified block diagram of a facsimile receiving terminal including a complementary run length decoder.
Figure 5:
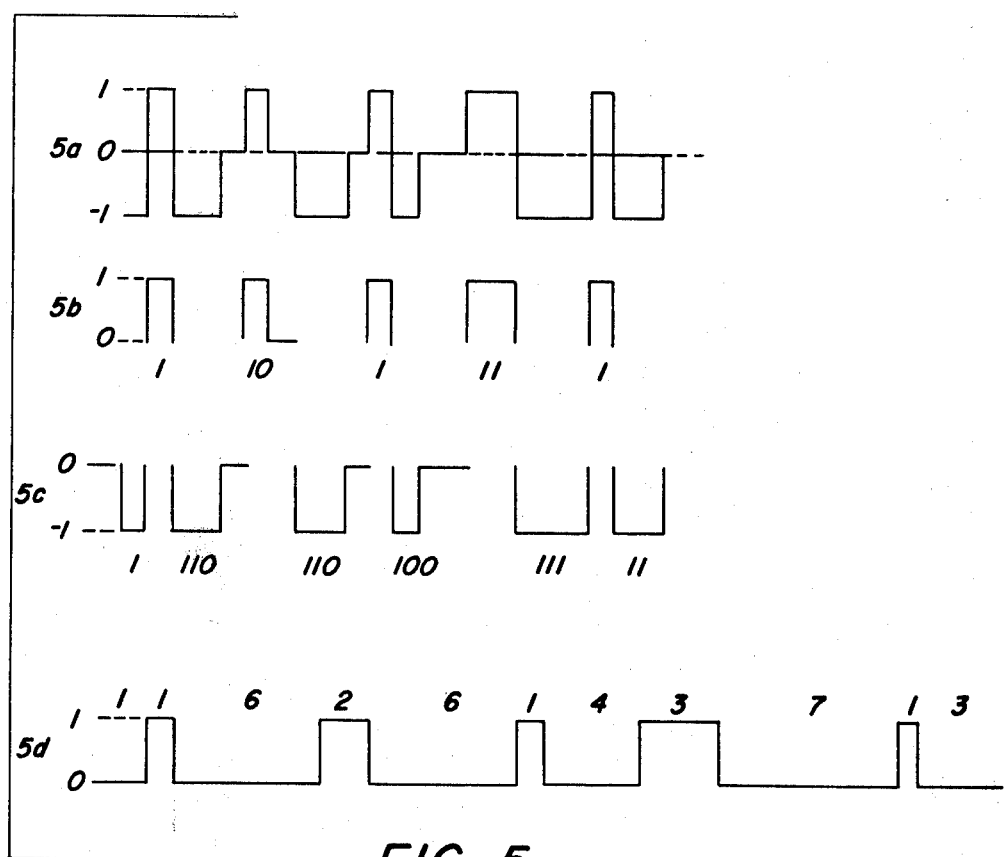
FIG. 5 illustrates the decoding process performed by the decoder of FIG. 4.

Turning to FIGS. 4 and 5, at the receiving terminal 12, the passband signal is amplified by an automatic gain controlled amplifier 31 and the demodulated by a demodulator 32, thereby recovering the ternary white and black run length message codes 5a and the control signals (not shown). A ternary decoder 33 responds to the distinctive amplitude transitions between successive ternary message codes to gate the bits of equivalent binary black and white run length message codes 5b and 5c, respectively, to a run length decoder 34 which, in turn, reconstructs the information bearing binary video signal 5d run length-by-run length.

A print head driver 35 actuates a suitable motor 36 in response to the reconstructed video signal 5d to translate a print head (not shown) along successive scan lines of a recording medium (also not shown). Additionally, the reconstructed video signal 5d is fed through a print head controller 37 to a print head write circuit 38, whereby the print head is selectively energized to print a replica or "facsimile" of the subject copy on the recording medium. As will be appreciated, the printing takes place as the print head scans in, say, a forward direction. Preferably, the write circuit 38 is blanked by a blanking signal supplied by the print head driver 35 while the print head is retracing or flying back in the opposite or reverse direction.

CONCLUSION

In view of the foregoing, it will now be understood that relatively simple and reliable methods and means have been provided for identifying the boundaries between serial run length message codes. Furthermore, it will be appreciated that the same message codes can, if desired, be used for black and white run lengths, thereby minimizing the number of members required to form a complete code set. Moreover, it will be understood that the presence of the distinctive amplitude transitions at the boundaries of the ternary codes reduce the risk of significant errors being introduced by transmission noise. Indeed, since black and white discriminative information is retained, there is virtually no risk of a run of one sense being invented to appear as a run of the opposite sense.

I claim:

1. A data compressor for compressing a binary video signal having a raster scan format, said video signal having one logic level for background representing picture elements and an opposite logic level for image representing picture elements; said compressor comprising the combination of
    white run length encoding means for converting runs of said video signal at said one logic level into binary white run length message codes,
    black run length encoding means for converting runs of said video signal at said opposite logic level into binary black run length message codes, and
    ternary encoding means for alternatively responding to the binary white and black message codes from each scan line of said video signal and for selectively level shifting bits of said message codes to provide a series of ternary black and white run length message codes having intra-scan line code boundaries marked by distinctive amplitude transitions.

2. The data compressor of claim 1 wherein
    said binary run length message codes are of variable length, all of said binary message codes comprise at least an initial bit of a given logic level, and at least some of said binary message codes include at least one additional bit of an opposite logic level; and
    said ternary encoding means selectively level shifts the bits of said binary message codes so that said ternary message codes have one level corresponding to the given logic level bits of the black binary message codes, another level corresponding to the given logic level bits of the white binary message codes, and an intermediate level corresponding to the opposite logic level bits of the black and white message codes, thereby providing said distinctive amplitude transitions at the code boundaries.

3. The data compressor of claim 2 wherein said black and white run length encoders generate the same binary message codes in response to black and white runs, respectively, of the same length.

4. A facsimile system for providing a facsimile copy of a subject copy in response to a binary video signal having a raster scan format; said system comprising a transmitting terminal, a receiving terminal, and a limited bandwidth communications channel for interconnecting said transmitting and receiving terminals;
    said transmitting terminal including
        white run length encoding means for converting runs of background representing picture elements within said video signal into binary white run length message codes,
        black run length encoding means for converting runs of image representing picture elements within said video signal into binary black run length message codes,
        ternary encoding means for selectively level shifting bits of said black and white message codes and for interleaving said message codes on a scan line-by-scan line basis to provide a series of ternary black and white run length message codes having any intra-scan line code boundaries marked by distinctive amplitude transitions, and
        modulating means for amplitude modulating a carrier signal in accordance with said ternary message codes to provide a passband signal for transmission to said receiving terminal via said communications channel; and
    said receiving terminal including
        demodulating means for recovering said ternary codes from said passband signal,
        ternary decoding means for recovering said binary black and white run length message codes from the recovered ternary codes,
        run length decoding means for reconstructing said binary video signal in response to the recovered binary black and white run length message codes, and
        means for printing said facsimile copy in response to the reconstructed video signal.

5. The facsimile system of claim 4 wherein
    said binary black and white run length message codes are of variable length and each include at least an initial bit of a given logic level, and
    said ternary encoding means shifts bits of said black message codes which are at said given logic level to a first level, bits of said white message codes which are at said given logic level to a second level, and bits of said black and white message codes which are at an opposite logic level to a third, intermediate level, thereby creating said distinctive amplitude transitions at the ternary code boundaries.

6. A method for compressing a binary video signal having a raster scan format and including picture elements representing background areas and image areas, said method comprising the steps of
    converting runs of background representing picture elements within said video signal into binary white run length message codes,
    converting runs of image representing picture elements within said video signal into binary black run length message codes, interleaving said white and black run length message codes on a scan line-by-scan line basis, starting with a white run length message code for each scan line, and selectively level shifting bits of the interleaved white and black run length message codes to provide a series of ternary black and white run length message codes having distinctive amplitude transitions to identify intra-scan line code boundaries.

7. The method of claim 6 wherein said binary white and black run length message codes are of variable length, but each include at least an initial bit of a given logic level; and said level shifting translates bits at said given logic level of said binary black run length message codes to a first level, bits at said given logic level of said binary white run length message codes to a second level, and any bits of said binary black and white run length message codes which are at an opposite logic level to a third level intermediate said first and second levels, thereby providing said distinctive amplitude transitions at the code boundaries.

* * * * *